(12) United States Patent
Zimmermann et al.

(10) Patent No.: US 9,425,506 B2
(45) Date of Patent: Aug. 23, 2016

(54) MULTI-BEAM SHAPE SUPPLEMENTARY DEVICE

(75) Inventors: Lars Zimmermann, Stephanskirchen (DE); Benjamin Bien, Rosenheim (DE); Markus Mohr, Rosenheim (DE); Tobias Hoffmann, Brannenburg (DE)

(73) Assignee: KATHREIN-WERKE KG, Rosenheim (DE)

( * ) Notice: Subject to any disclaimer, the term of this patent is extended or adjusted under 35 U.S.C. 154(b) by 452 days.

(21) Appl. No.: 14/008,672

(22) PCT Filed: Feb. 29, 2012

(86) PCT No.: PCT/EP2012/000875
§ 371 (c)(1),
(2), (4) Date: Sep. 30, 2013

(87) PCT Pub. No.: WO2012/130367
PCT Pub. Date: Oct. 4, 2012

(65) Prior Publication Data
US 2014/0022124 A1    Jan. 23, 2014

(30) Foreign Application Priority Data
Mar. 30, 2011 (DE) .................. 10 2011 015 551

(51) Int. Cl.
*H01Q 3/00* (2006.01)
*H01Q 3/30* (2006.01)
(Continued)

(52) U.S. Cl.
CPC ................. *H01Q 3/30* (2013.01); *H01Q 1/246* (2013.01); *H01Q 3/005* (2013.01); *H04W 88/085* (2013.01)

(58) Field of Classification Search
CPC .............................. H01Q 3/26; H01Q 25/002
USPC ......... 342/81, 154, 368, 372, 373; 455/562.1, 455/575.7
See application file for complete search history.

(56) References Cited

U.S. PATENT DOCUMENTS

| | | |
|---|---|---|
| 2005/0105552 A1 | 5/2005 | Osterling |
| 2010/0113097 A1 | 5/2010 | Seeor et al. |
| 2011/0237315 A1 | 9/2011 | Seeor et al. |

FOREIGN PATENT DOCUMENTS

| | | |
|---|---|---|
| GB | 2 468 730 | 9/2010 |
| WO | WO 02/061877 | 8/2002 |

(Continued)

OTHER PUBLICATIONS

English translation of the International Preliminary Report on Patentability and Written Opinion of the International Searching Authority mailed Oct. 10, 2013, issued in corresponding International Application No. PCT/EP2012/000875.

(Continued)

*Primary Examiner* — Dao Phan
(74) *Attorney, Agent, or Firm* — Nixon & Vanderhye P.C.

(57) ABSTRACT

A multi-beam shape supplementary device for an antenna system for mobile communications includes a site-sharing adapter in the form of a primary adapter. The site-sharing adapter comprises at least two primary terminals for connecting at least two primary control apparatuses. The plug and/or terminal configuration or terminal occupation at the primary terminals are terminal-compatible with the terminals on the coupling terminal side of the site-sharing adapter. The pin or socket terminals provided for the bidirectional signal transmission in the site-sharing adapter are connected to a terminal pin or a terminal socket, provided for the bidirectional signal transmission, of the coupling terminal so as to form a bidirectional signal transmission path. The bidirectional transmission path is configured in such a way that the differentiated communications signals at the at least two primary terminals are converted into frequency-modulated signals.

16 Claims, 7 Drawing Sheets

(51) Int. Cl.
*H01Q 1/24* (2006.01)
*H04W 88/08* (2009.01)

(56) References Cited

FOREIGN PATENT DOCUMENTS

| WO | WO 2009/102774 | 8/2009 |
| WO | WO 2009/102775 | 8/2009 |
| WO | WO 2010/146471 | 12/2010 |
| WO | WO 2011/047322 | 4/2011 |

OTHER PUBLICATIONS

International Search Report for PCT/EP2012/000875 mailed Jun. 6, 2012.
Written Opinion of the International Searching Authority mailed Jun. 6, 2012.
Lumberg: 03—Rundsteckverbinder mit Schraubverschluss nach IEC 60130-9, IP 40/IP 68, Dec. 2009, http://wwwlumberg.com/main/download/zusatzinfo/Uebersicht 03.pdf (abgerufen am 30.11.2011), 6 pages.
Norm AISG v2.0:13.06.2006, Control interface for antenna line devices, 13$^{th}$ Jun. 2006, 42 pages.

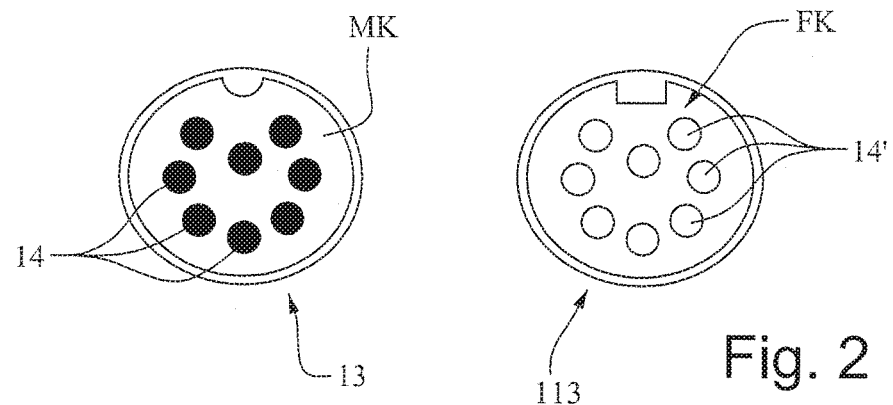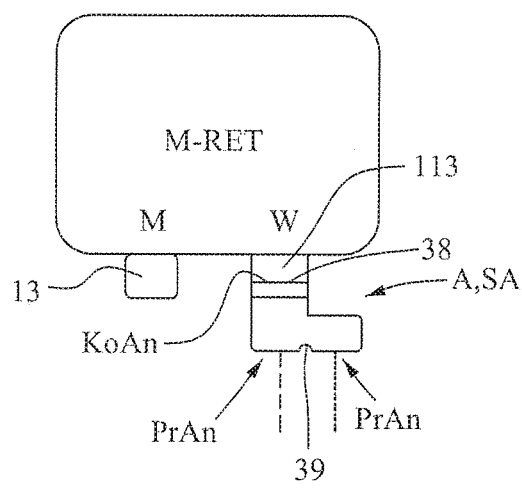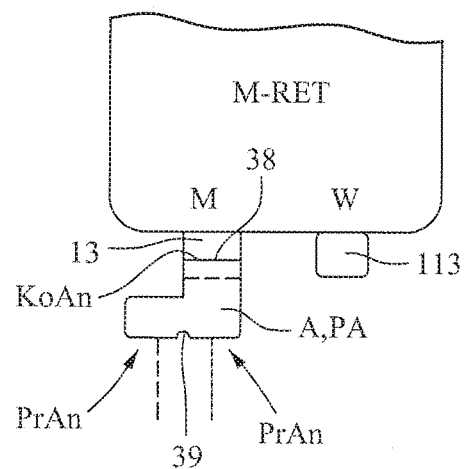
Fig. 2
Fig. 3          Fig. 4

MULTI-BEAM SHAPE SUPPLEMENTARY DEVICE

CROSS-REFERENCE TO RELATED APPLICATIONS

This application is the U.S. national phase of International Application No. PCT/EP2012/000875 filed 29 Feb. 2012 which designated the U.S. and claims priority to DE 10 2011 015551.1 filed 30 Mar. 2011, the entire contents of each of which are hereby incorporated by reference.

STATEMENT REGARDING FEDERALLY SPONSORED RESEARCH OR DEVELOPMENT

None.

FIELD

The invention relates to a multi-beam shape supplementary device and to a multi-beam shape control device to which the multi-beam shape supplementary device is or can be connected.

BACKGROUND AND SUMMARY

Beam shape control devices are used in particular in mobile communications technology, that is to say in mobile communications base stations, so as to set the transmission angle of the primary source of a mobile communications antenna. Depending on the down-tilt angle, the relevant mobile communications cell can be illuminated to different extents and thus be set.

When referring to beam shape control devices of this type, it is conventional to use the term "RET unit" or "remote electrical tilt" device, as known for example from WO 02/061877 A2. However, by means of a beam shape device of this type, which as stated above is preferably referred to as a multi-beam shape control device, not only is it possible for example to set a different down-tilt angle in the elevation direction via different settings of phase shifters, but it is also possible, in particular in an antenna array comprising a plurality of gaps, to set the primary transmission direction and thus the primary source of an antenna system in the horizontal direction, that is to say at a different azimuth angle, for example by using phase shifters. Finally, by means of a beam shape control device, not only is it possible to set a different orientation of the primary radiation direction of an antenna system in the elevation direction and/or in the azimuth direction, but it is also possible to set the beam width differently both in the azimuth and in the elevation direction, so as thus to be able to set the half-power beam width of a primary beam lobe differently in this context. Likewise, it is also possible to implement settings for the mechanical angle of an antenna, namely the roll, pitch and yaw.

In other words, the previously known antennas are generally configured in such a way that what is known as the RET unit can be installed on a mechanical interface provided therefor (for example on the lower mounting flange of the antenna housing), and also comprises, in addition to the electronics, a motor which controls the phase shifters integrated into the antenna via a mechanical transformation. The phase change achieved in this manner acts directly on the beam characteristic, that is to say on the down-tilt angle of the antenna.

It is possible in principle to set the beam characteristic of multi-antenna systems differently by means of RET units of this type, it being possible to use the aforementioned RET motors for setting the primary beam direction of the antenna not only in the vertical direction (that is to say in the elevation direction for setting a different down-tilt angle), but also in the horizontal direction (that is to say in the azimuth direction), and even for setting the half-power width of a primary lobe.

In this context, it is known in principle that the control unit, known as the RET unit, comprising the associated motor can be arranged inside the antenna arrangement, that is to say inside the radome. By contrast, WO 02/061877 A2 proposes installing an RET unit of this type outside the radome, preferably directly beneath a mounting flange of the antenna arrangement, and this has the advantage that an RET unit of this type can also be retrofitted without opening the antenna cover (radome).

As a result of site-sharing scenarios (in which network operators share a site), and in the event of what are known as co-siting scenarios (in which one network operator operates a plurality of base stations, possibly of different mobile communications generations or mobile communications technologies, on one site), a higher number of antennas are increasingly being installed per site. At least since UMTS was introduced, the majority of the installed antennas have been supplemented by a system which ultimately makes it possible to control the beam characteristic of the antennas electrically. This is the above-disclosed RET configuration, by means of which a down-tilt angle can be set differently remotely.

In general, the various antenna manufacturers have created their own proprietary mechanical interfaces for this purpose, meaning that even the respective configurations of what are known as single-beam or multi-beam shape devices (actuators) vary between manufacturers.

The control side of the RET actuators is specified in the AISG or 3GPP standard. Thus, by means of one control apparatus, the RET actuators of different antenna manufacturers can be controlled via this standardised interface. So as to cover the single-RET and multi-RET actuators in the standard, the two apparatus types "single-RET" (device type 0x01) and "multi-RET" (device type 0x11) have been specified for this purpose.

One possible implementation of a multi-RET is for example accommodated in a single housing, which is equipped with a plurality of the manufacturer-specific mechanical interfaces. After being mounted on a corresponding multi-band antenna, the multi-RET can thus, under the control of a control apparatus, control the beam characteristics of the individual bands. However, the embodiment is only possible or expedient if the plurality of mechanical interfaces on the antenna are such that they can be operated by means of a single apparatus.

In multi-band antennas from other manufacturers, a multi-RET solution of this type in a single housing is not always possible, because of the different configurations of the mechanical interfaces. Depending on the antenna type, said interfaces may also possibly be located in different places.

For example, WO 2009/102775 A2 discloses a multi-beam shape device in the form of a multi-RET device, which has three manually actuable setting axles via which for example three separate antenna arrays can be controlled. To simplify the overall construction, it is proposed to use a shared control device for all three beam shape devices.

WO 2009/102774 A1 further discloses a multi-beam shape control device which comprises the corresponding input and output axles for controlling the antenna device. In this context, an option is proposed of decoupling the DC motor of the drive means from the phase shifter setting shaft, so as to be able to operate the phase shifter control buttons manually in a simpler manner.

Multi-band antennas are thus equipped with the aforementioned "single-RET actuators" as a function of the band. Thus, the possibility of reducing the cost of the "antenna+ RET" system, which is available to the manufacturer of a "multi-RET" (which can be implemented in a single housing), cannot be exploited by every antenna manufacturer.

The publication "Lumberg: 03—Circular plug-in connector comprising a screw lock in accordance with IEC 60130-9, IP 40/IP 68. 12/2009. URL: http://www.lumberg.com/main/download/zusatz-info/Uebersicht_03.pdf [retrieved on 30.12.2011]" discloses inter alia plug-in connections which can be used for various purposes. Inter alia, page 5, top right, shows an overview of a circular plug-in connector comprising a screw lock. Some of these plug-in connection devices comprise a terminal provided with a male plug configuration and three further plug-in connection devices provided with a female plug-in connection. This is for example a DC power and control signal splitter, in which a terminal in accordance with the AISG protocol can ultimately be divided over for example three terminals. In general, in this context the corresponding pins/plugs are interconnected, in such a way that the aforementioned three outputs can be connected in parallel with one another.

The widespread AISG standard is known for example from the publication "AISG standard v2.0: 1.06.2006, Control interface for antenna line device", in which for example point 6.3.2 "Polarity of multi-pole connectors" states that these multi-pole connector collectors may comprise a socket having a female connector configuration and an input socket having a male connector configuration and optionally a second output socket having a female connector configuration.

Against this background, the object of the present invention is to provide an improved antenna device (in particular a base station) comprising a multi-beam shape device, that is to say what is known as a multi-RET arrangement, which is accommodated for example in one housing, and which makes what is known as site-sharing operation possible as well as the conventional operation. In other words, by means of a multi-RET unit, an antenna of this type should be able to be used for example even by two or more network operators mutually independently, in such a way that the two or more network operators can mutually independently implement beam characteristic settings for the frequency bands assigned to them on the antenna (for example set a different down-tilt angle). This equally applies to the case where for example a network operator wishes to operate an antenna device of this type via two or more different base stations.

The object is achieved according to the invention in accordance with the features specified in claim 1 in relation to a multi-beam shape supplementary device and in accordance with the features specified in claim 11 in relation to a multi-beam shape control device. Advantageous embodiments of the invention are specified in the dependent claims.

By way of the present invention, by extremely simple means, a cost-effective possibility is provided for improving an antenna device in general and a mobile communications system (for example for a base station) in particular, for example in the form of a supplementary device which is configured in such a way that the for example one dual-band to hexa-band antenna can be operated not only by one network operator, but if required also by two or more network operators or via two or more base stations of one network operator mutually independently. Therefore, in this regard it may also generally be said that in the context of the invention a corresponding antenna device can be operated by two or more independent primary control apparatuses, that is to say what are known as primaries, one primary control apparatus for example being assigned to one network operator and the other primary control apparatus being assigned to the other, second network operator, or one network operator accordingly being able to operate the antenna via two separate primaries which are accommodated in two separate base stations. Regardless of this, the inventive solution is distinguished by the simplicity and the cost-effective implementation thereof.

In the following, the terms "network operator" and/or "primary control apparatus" are often used instead of the short form "primary".

The invention starts from a multi-RET unit, which conventionally comprises a primary communications interface, for example an eight-pole communications interface comprising an eight-pin terminal configuration in the form of what is known as a male plug. However, if for example a plurality of antennas is controlled correspondingly on one site, a further, "secondary" communications interface may be provided for each of a second, third or more antennas which are additionally provided on the same site, making chaining to a subsequent antenna possible, specifically in the form of what is known as daisy-chaining. In this context, this second communications interface, which leads to a following antenna or a following RET unit, may in principle likewise be constructed in the same manner as the first communications interface, but generally as a female plug-in device if the first communications interface is configured as a male plug-in device (or vice versa).

If an antenna device of this type is now to be operated by two network operators/primary control apparatuses (primaries) or via two different base stations of one or more network operators, completely mutually independently, in the context of the invention a slight modification to the configuration can be ensured in that for example an adapter can be placed on the second communications interface provided for the daisy-chain wiring, the terminal configuration of "female plug-in device" being modified to "male plug-in device", the same plug-in terminal configuration thus being present as in the first communications interface. Thus, according to the invention, what is known as a site-sharing adapter or a corresponding site-sharing adapter device is provided, via which a plurality of further primary communications interfaces, that is to say at least two and preferably three, are provided, on which a plurality of additional network operators or at least in general a plurality of additional primaries, that is to say at least two or three additional primaries, can operate the antenna, and thus share the same antenna arrangement with other network operators/primaries.

Thus, in a preferred embodiment of the invention, as mentioned above, the aforementioned site-sharing adapter arrangement comprises an adapter device, also referred to as a secondary adapter for short in the following, which can be placed on or generally connected to the aforementioned secondary communications interface—which is actually provided for bringing about daisy-chaining to a following antenna device—and which changes a corresponding connector configuration of this secondary communications interface into a connector configuration for connecting further network operators/primary control apparatuses.

As an alternative to the aforementioned secondary adapter or in addition to the aforementioned secondary adapter, the site-sharing adapter arrangement may also comprise a further adapter, of a different construction or provided in addition, specifically an adapter device, referred to as a primary adapter for short in the following, which can be placed on or connected to the primary communications interface of the antenna device. This primary adapter is likewise an adapter which makes branching possible, of which a first terminal point can in this embodiment be placed on and connected to the primary communications interface of the antenna, and which comprises at least two communications interfaces opposed thereto, to which the corresponding connection cable of a plurality of further different, that is to say separate network operators or primaries, in particular at least two or preferably three, can now be connected. This likewise makes it possible to ensure in an antenna device that this antenna device can now be operated and exploited jointly by at least two network operators without major additional measures.

The aforementioned site-sharing adapter thus makes it possible to connect more than one primary, for example two or three primaries, to a multi-RET. These primaries may thus set or adjust the beam characteristics of the frequency bands assigned thereto of a multi-band antenna mutually independently.

In this context, it is preferably provided that this independence is achieved both in the communication between the primary control apparatuses and the multi-RET and also in the individual power supply. That is to say, in this case—for example if a primary control device activates an adjustment of the phase shifters—the power required for this should be drawn in a correctly assigned manner from this primary or a power source physically associated with this primary, that is to say a primary control apparatus or a power source physically associated with this primary control apparatus.

In this context, in a preferred embodiment it is provided that in a standby mode (idle mode) what is known as the standby power of the multi-RET can be covered via each physical terminal. This is preferably implemented using an OR circuit, which ensures that the power supplied by at least one primary is passed on to the multi-RET and to further provided electronic components and assemblies. In this context, it is also possible for the supply voltage, which is for example brought together in the site-sharing adapter via a star point, to be converted by a step-down converter to a voltage lower than all of the applied input voltages.

In active operation, as opposed to standby operation, additional measures are preferably provided. In this context, active operation is distinguished from standby operation in that one or more actuators can be operated, in addition to the standby power supply of the electronics installed in the multi-RET. The power uptake of these actuators may increase considerably from the standby power, meaning that a virtually arbitrary power uptake of any old connected primary can no longer be tolerated. Therefore, electronics are preferably provided in the site-sharing adapter which draw the current supply required for the active power operation from each primary control apparatus which activates and wishes to carry out corresponding beam shaping via the multi-RET.

By contrast with the previous solution, the site-sharing adapter provided according to the invention has the major advantage, as a multi-beam shape supplementary device, that an antenna, in particular a mobile communications antenna (for a base station) or a multi-RET unit used in this context can be produced and used cost-effectively for individual operation, and that only minor additional measures are required, specifically in the form of an aforementioned site-sharing adapter, so as subsequently also to be able, without difficulty, to have the antenna operated by two, three or more network operators independently of each other in what is known as a site-sharing mode, by using this site-sharing adapter. That is to say, the additional costs brought about by the site-sharing adapter only fall when a plurality of primaries/network operators are actually sharing an antenna system.

BRIEF DESCRIPTION OF THE DRAWINGS

In the following, the invention is explained in greater detail by way of drawings, in which, in detail:

FIG. 2 is a schematic plan view of a primary and a secondary communications interface on the multi-RET unit provided in FIGS. 1a and 1b;

FIG. 3 is a schematic view of a multi-RET unit comprising a connected site-sharing adapter in the form of a secondary adapter;

FIG. 4 is a drawing corresponding to FIG. 3, but using a primary adapter as a site-sharing adapter;

FIG. 6a shows an embodiment of a multi-RET unit slightly modified from FIG. 5a;

DETAILED DESCRIPTION OF PREFERRED EMBODIMENTS

Figure 1A:
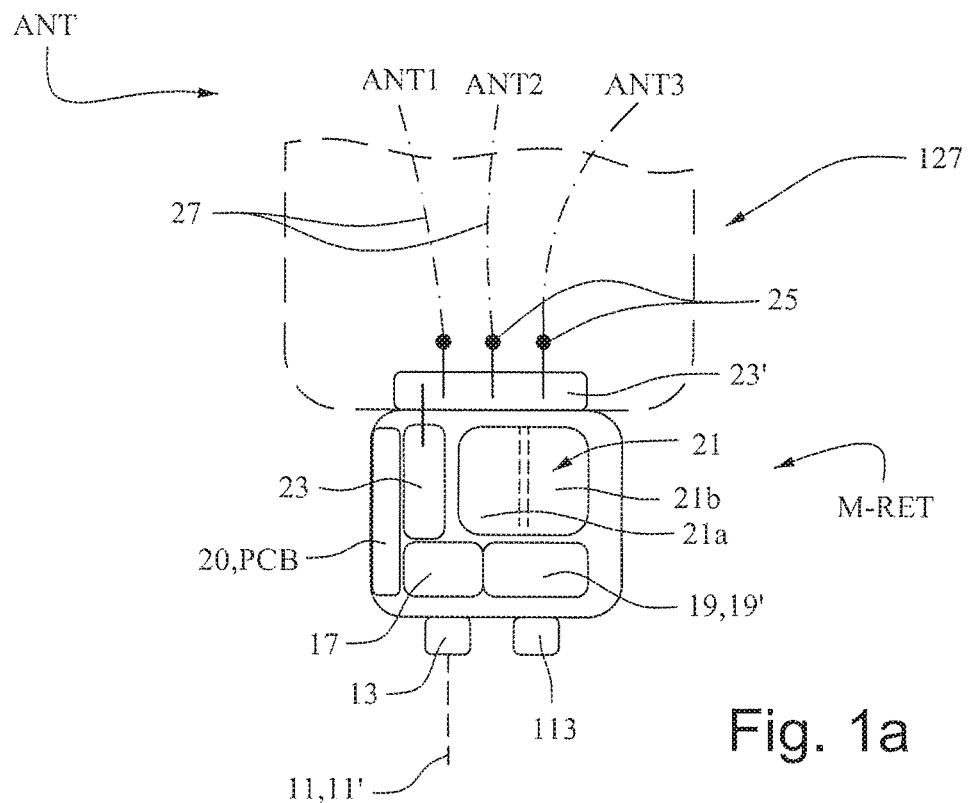
FIG. 1a: is a schematic drawing of a multi-RET unit according to the invention, as installed on the underside of an antenna device (shown only in part in dashed lines)

In the embodiment according to FIG. 1a, an overall antenna arrangement ANT is shown in a schematic drawing, and is to comprise three individual, optionally integrated antenna devices ANT1, ANT2 and ANT3 on one antenna site, which for example act as separate antenna devices and in this context may for example transmit and/or receive beams in three different frequency bands.

In this context, FIG. 1a merely shows the terminal couplings, explained in greater detail in the following, in the abstract position thereof, corresponding antenna elements not being illustrated in FIG. 1a.

In the embodiment shown, for the separate down-tilt and/or for beam orientation not only in the elevation direction but also in the horizontal direction and/or for the beam shaping which may be possible by setting a different half-power width of these three antenna devices ANT1, ANT2 and ANT3, a multi-beam shape device M-RET is provided, also referred as M-RET for short and/or as a multi-beam shape control device in the following, since the beam shaping is to be controlled and triggered thereby. Likewise, it is also possible to implement settings for the mechanical angles of an antenna, namely the roll, pitch and yaw. Thus, quite generally speaking, in the context of the multi-beam shape device according to the invention any desired beam shaping may be carried out within wide ranges, in such a way that, in other words, a radiation diagram of a corresponding antenna device, in particular a mobile communications antenna device, can ultimately be set and/or altered accordingly by way of one or more of the aforementioned measures or else in some other manner.

This multi-beam shape control device M-RET comprises a communications interface 13, via which a communications bus 11, for example in the form of a corresponding (for example five-line or eight-line) communications cable 11' (only shown dashed in FIG. 1) is connected directly or indirectly to a control apparatus which is for example integrated into a base station, generally to what is known as a primary. Therefore, in the following, the term "primary control apparatus" is also used instead of "primary". However, the operation of what is known as a primary control apparatus (primary) may also be integrated into parts of a base station, for example in a separate unit such as a remote radio head, also known as an RRH for short. Thus, an AISG plug or plug-in connector may be used as a communications interface (similarly to the prior art). The aforementioned primary, that is to say generally the base station or for example a primary control apparatus (not shown in greater detail) integrated into the base station, can communicate with the aforementioned multi-beam shape device M-RET (device type 0x11) using a suitable protocol, for example an AISG2.0/3GPP protocol. If the communication takes place for example using the AISG1.1 protocol, the M-RET is mirrored on a plurality of single-RET actuators (device type 0x01), since the device type 0x11 has not been defined in this standard. This aforementioned communications interface 13 for connecting a primary control apparatus is also referred to as a primary communications interface 13 for short in the following FIG. 1a also schematically shows that the multi-beam shape control device comprises inter alia electronics 20, for example comprising a printed circuit board PCB, a lightning protection means 17, a power supply means 19 (sometimes also referred to in the following as an internal network component 19'), a microprocessor means 21 comprising associated motor drivers, and an electrical actuator 23 (for example in the form of an electric motor, a stepper motor, a magnetically actuable adjustment means etc.) which is connected to an associated mechanical output 23' comprising mechanical interfaces 25.

In this case, transmission means 27 (not shown in greater detail) may be provided on the coupling arrangements 25, and lead for example to phase shifter devices, so as to adjust particular phase shifters selectively, by way of corresponding control of the multi-beam shape device, in such a way that the radiators controlled in this manner of an antenna device ANT1, ANT2 and/or ANT3 can be set at a different down-tilt angle selectively and as required. Likewise, by means of the corresponding control device comprising the following actuators 23, via the coupling points 25, different further beam shape control devices can be operated selectively and corresponding different beam shaping of the connected antennas can be brought about. In this context, the aforementioned transmission means 27, which are or can be connected to the individual coupling points 25, are any desired components, which may also be implemented differently, of a measure generally denoted as an antenna setting device 127, so as to be able to set the aforementioned antennas ANT1 to ANT3 differently in terms of the beam configuration thereof, individually and as required.

Figure 1B:
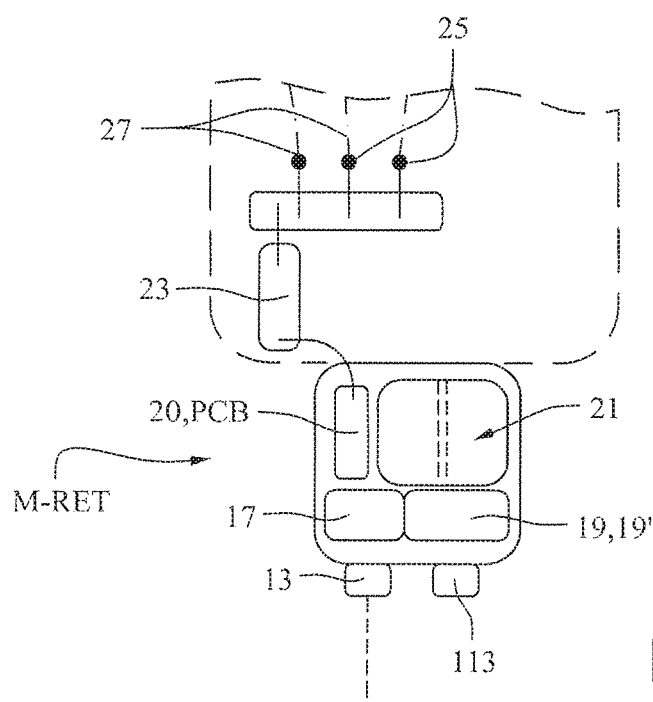
FIG. 1b is a drawing corresponding to FIG. 1a with a slightly modified multi-RET unit.

Merely for completeness, it is noted, referring to FIG. 1b, that what is known as the multi-RET unit, as disclosed by way of FIG. 1a, may also be formed without a corresponding drive means or motor, that is to say without an electric actuator 23, since the corresponding actuator, that is to say the drive means 23, can also be integrated into the antenna means, that is to say accommodated within the antenna housing (radome), as can be seen from FIG. 1b, so as thus selectively to adjust the gearing means 23', also integrated into the antenna, as well as the indicated transmission means 27 so as to set the beam properties (down-tilt) and the individual radiator elements thereof. Further modifications are possible in this regard.

It is further noted that it is also possible for example for only the gearing means 23' comprising the following transmission means 25, 27 to be accommodated in the antenna housing, and the drive means 23 may optionally also be accommodated in the multi-RET unit M-RET. In this context, any desired distributions or divisions may be possible.

In this context, the aforementioned first or primary communications interface 13 is generally a male terminal, which is also referred to as a male connector MK for short in the following. This male connector MK may for example comprise a multi-pin plug arrangement, for example an eight-pole multi-pin plug arrangement, and thus be formed with an eight-pin configuration (comprising eight pins 14, as shown in FIG. 2). In this context, eight-pole AISG plugs of this type are frequently used, since by means thereof the relevant RET unit can be operated using a suitable protocol, for example using an AISG-1.1, an AISG-2.0 etc.

Aside from this—as can also be seen from the plan view of the communications interfaces in FIG. 2—a second or secondary communications interface 113 is provided, and contrary to the first communications interface 13 (which is in the form of a male connector MK) is formed in the manner of a female connector FK comprising for example eight sockets 14'. In this way, daisy-chaining to a further RET unit or multi-RET unit and thus to a further downstream antenna device can be provided, so as also to control or operate this device via the shared communications connection 11, 11'.

An antenna of this type can be used in the conventional manner by a single network operator, specifically as an individual antenna device or via the additional second communications terminal FK for operating further additional antenna devices.

Since the aforementioned multi-RET, disclosed by way of FIGS. 1a and 1b, is generally provided with at least one primary plug-in connection option in the form of a socket or a plug, which is also referred to as a primary or secondary communications terminal or communications interface 13 or 113 in the following, a primary can generally be connected to the primary communications interface 13. If provided, chaining to one or further multi-RET devices, or chaining of these multi-RETs to another component typical to the system such as a single-RET, can be implemented at the secondary communications interface 113.

However, if a plurality of primaries, in particular at least two or preferably three independent primaries, are now to be connected to the multi-RET, in the context of the present invention this is implemented in the form of a site-sharing adapter, which for example has four primary terminals. One primary terminal for example provides the connection to the secondary communications terminal of the multi-RET. At the remaining three primary terminals, referred to as primary terminals PrAn for short in the following, the aforementioned two or for example three (or in general a plurality of) primaries can be connected.

As can be seen from FIG. 3, as a multi-beam shape supplementary device, it is merely necessary for the terminal side 38 of the aforementioned site-sharing adapter A to be connected to the second communications interface 113, that is to say for the coupling terminal KoAn thereof to be placed on and thus connected to the adapter point provided for the daisy-chaining. A site-sharing adapter A of this type is additionally characterised in that it changes the connector terminal configuration found at the communications interface 113 of the M-RET unit, which in the present case consists of a female connector FK, at the opposing free terminal side 30 thereof into an opposite connector configuration, specifically into a male connector configuration MK. In other words, the two terminal sides 38 and 39 of the adapter A, in this case in the form of what is known as a site-sharing adapter A, are provided with a male configuration MK. That is to say, both on the coupling side 38 of what is known as the coupling terminal KoAn of the site-sharing adapter A and on the opposite terminal side 39, the two primary terminals PrAn which are provided there in this embodiment are provided with the male connector configuration MK using pins 14, it being possible for the coupling terminal KoAn on the coupling side 38 to be plugged onto the secondary communications interface 113 comprising the female connector configuration FK.

Since in the embodiment shown the aforementioned site-sharing adapter A (in general the corresponding site-sharing adapter arrangement A) is plugged onto the secondary communications interface 113, in this application this adapter A is sometimes also referred to as a secondary adapter SA in the following.

In the following, by way of the embodiment according to FIG. 4, an alternative solution is disclosed in which, instead of what is known as a secondary adapter SA as disclosed by way of the previous embodiments, a primary adapter PA is or can be connected to the primary communication interface 13 by the coupling terminal KoAn thereof as a site-sharing adapter A.

Since a primary can already be connected to the primary communications interface 13 per se, to expand the operation in this case the primary adapter PA is formed as a branching adapter, in such a way that it comprises at least two primary terminals PrAn on the terminal side 39 opposing the primary communications interface 13 and thus opposing the coupling terminal KoAn of the coupling terminal side 38.

Since in the embodiment shown the primary communications interface 13 comprises a male connector configuration MK, the corresponding terminal of the primary adapter PA which can be placed thereon is provided with a female connector configuration FK, in such a way that, in other words, the male connector configuration MK is maintained on the primary communications interface 13 on the terminal side 39 remote therefrom on the two primary terminals PrAn formed therein of the primary adapter PA. The same would apply if the primary communications interface 13 had a female connector configuration FK. In this case, this same female connector configuration FK would be provided at the primary terminals PrAn.

Thus, in the embodiment shown, in this case two primary communications lines or respectively two communications busses 11 can be connected.

The various embodiments have been explained in the case where the primary communications interface 13 has a male connector configuration MK and the secondary communications interface 113 has a female connector configuration FK. Accordingly, in each case the coupling terminal KoAn of the adapter to be connected should be chosen conversely, the adapter on the terminal side 39 subsequently having the primary terminals PrAn having a connector configuration corresponding to the primary communications interface 13 and the chaining terminals VeAn (if provided) each having a connector configuration corresponding to the secondary communications interface 113. In this context, it is irrelevant to the implementation of the invention whether the primary communications interface 13 has the male connector configuration MK and the secondary communications interface 113 has the female connector configuration FK or vice versa.

Figure 5A:
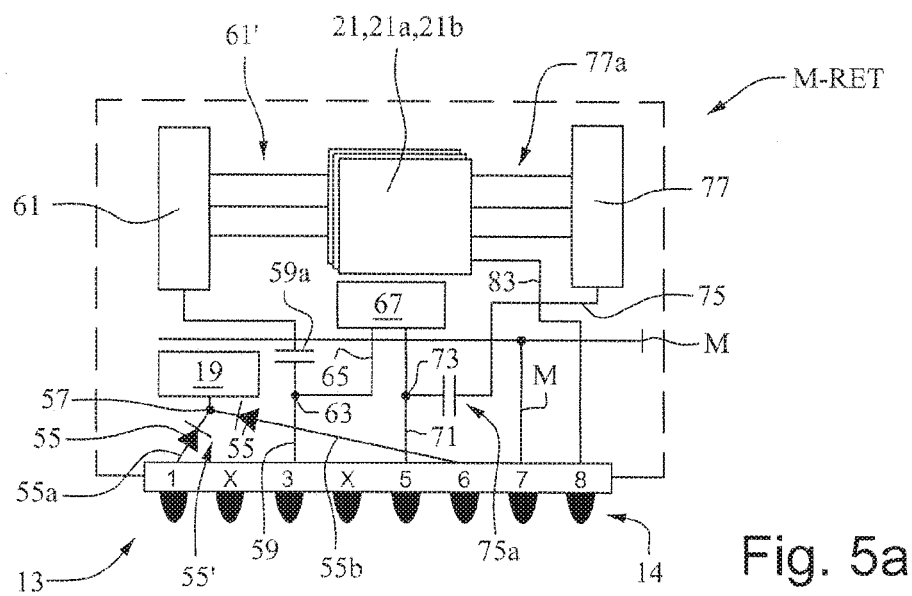
FIG. 5a is a sophisticated drawing of a multi-RET unit.
Figure 5B:
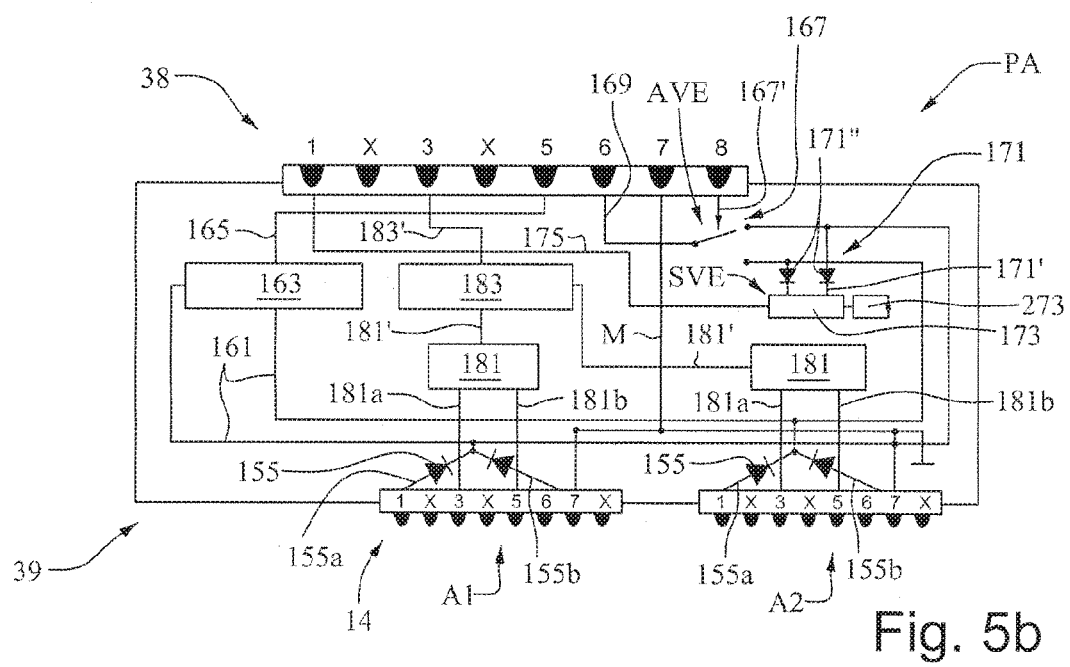
FIG. 5b is a more detailed drawing of a first embodiment according to the invention of a primary or secondary adapter comprising two provided primary terminals.

In the following, reference is made to FIGS. 5a and 5b, FIG. 5a showing a multi-beam shape control device M-RET and FIG. 5b showing a primary adapter PA, the coupling terminal KoAn of which can be connected to the primary terminal 13 (primary communications terminal 13) of the multi-beam shape device M-RET.

The multi-RET unit is basically constructed as disclosed by way of FIGS. 1a and 1b.

For example, a plug-in connection for use with the AISG specification is shown on the primary communications interface 13 comprising eight pins 14 which are numbered 1 to 8.

As can be seen, pin number 2 and pin number 4 are unoccupied and therefore crossed out in FIG. 5.

Pins numbers 3 and 5 serve for data transmission and thus for communication.

Pins numbers 1 and 6 serve for power supply, thus for providing the multi-RET unit M-RET with current.

An earth connection M is provided via pin number 7. Finally, pin number 8 is required so as to switch the connected primary adapter PA in terms of the power supply which is explained further in the following.

In this context, the aforementioned pin or plug occupation is in principle merely exemplary. In other words, the sequence of the plug-in connections (pins 14) may in principle be as desired and completely different. Thus, for example—as will be explained further in the following—a detection signal could be transmitted via pin number 3 and a communications signal via pin number 5, thus the opposite way round from the embodiment explained in the following. Likewise, for example, in the variant explained in the following of the site-sharing adapter, in which a separate detection modem is not even provided, a power switch 167 provided for this purpose could be controlled via pin number 3 instead of via a plug-in connection having number 5, shown in this variant of the embodiment described in the following etc. Any desired modifications are possible in this regard.

From the drawing according to FIG. 5a, it can also be seen that the first and sixth pins each lead via a diode line 55a or 55b, each comprising a diode 55, that is to say a line 55a from pin 1 or 55b from pin 6, to a shared summation or star point 57, resulting in an electrical connection to the power supply device 19, resulting in the assemblies of the multi-beam shape device M-RET being supplied with voltage and current.

It can further be seen from the drawing that pin number 3 is connected via a line 59 to an intermediate capacitor 59a comprising a communication modem 61, which could in principle be formed as a double modem but in the present case is formed as a triple modem, so as ultimately to be able to be used when connecting a primary adapter PA, explained further in the following, comprising three terminals for operating three primaries.

The third pin, that is to say pin number 3, is further connected via a communications line 65 (via the connection or branch point 63) to a communications transceiver 67. In the embodiment shown, the communications line 65, specifically what is known as the RS485-B line of the RS485 bus, is correspondingly formed in accordance with the AISG specification. In this embodiment, the communications line 71, which connects pin number 5 to the communications transceiver, represents what is known as the RS485-A line. By means of the communications transceiver 67, differentiated signals relating to the communication to be processed may for example be converted to TTL signals in accordance with the AISG specification and supplied to the microprocessor 21.

Pin number 5 is thus connected via a direct line 71 to the second input of the communications transceiver 67, a connection line 75 being connected from a branch point 73, with a capacitor 75*a* being interposed, to a detection modem 77, which could also be in the form of a double modem in the embodiment shown but is in the form of a triple detection modem 77 in the present case.

In addition, in FIG. 5*a* a switching line 83 from the microprocessor 21 is also connected to pin number 8.

Finally, it is also further noted that an earth line M is connected to terminal pin number 7, and is galvanically connected to an earth line M, accordingly explained further in the following, if a primary or secondary adapter PA or SA is connected.

In this context, an aforementioned primary adapter PA is connected to a multi-beam shape device M-RET of this type, it being assumed, as shown in the drawings, that the primary adapter PA is connected to the communications interface 13 at the primary terminal of the multi-beam shape device M-RET. Otherwise, an adapter A of the same construction, in the form of a secondary adapter SA, could be used for the connection to the secondary communications interface 113, and in this case it would be necessary to provide a male plug configuration MK instead of a female plug configuration FK at the terminal side 38 of the adapter A, since the secondary interface 113 on the M-RET unit is formed with a female terminal configuration FK rather than a male plug configuration (male configuration MK).

The primary or secondary adapter PA, SA thus comprises two primary terminals A1 and A2, specifically having plugs or pins 14 which are pin-compatible with the plugs or pins 14 on the primary communications interface 13 of the multi-beam shape device M-RET. In other words, the primary plug-in connection options of the site-sharing adapter A, in this case the primary adapter PA, are compatible for connection to the primary plug-in connection option of the multi-RET or a single-RET, that is to say the pin occupation specified for example in the AISG 1.1 standard for the eight-pole plug-in connection prescribed therein is also valid for the site-sharing adapter A, that is to say in the form of the primary adapter PA or the secondary adapter SA.

In this context, the site-sharing adapter A is constructed in such a way that for each terminal A1, A2, in each case pins/plugs numbers 1 and 6 are combined via a respective diode line 155*a* or 155*b* into a shared summation point or star point 157, an associated diode 155 being connected on each of the two diode lines 155*a*, 155*b*.

The respective summation or star point 157 of the two primary terminals A and B is connected to a separate detection line 161 in each case, which is positioned on the left of FIG. 5*b* and leads to a double detection modem 163, the output line 165 of which is connected to plug terminal number 5.

The opposite end of the respective detection line 161 leads to a toggle switch 167, which can be switched as a function of a signal from the plug terminal 8, and depending on the switch position connects one or other of the detection lines 161 via a power supply line 169 to a terminal, in this case a socket 14' numbered 6.

At the same time, the two detection lines 161 in this embodiment are connected via a diode circuit 171 to a respective diode line 171', comprising, for each diode line 171', one connected diode 171" comprising a DC/DC conversion means 173, which is connected to plug terminal number 1 via a permanent power supply line 175.

By way of this technical measure, a standby supply means SVE is provided, the significance of which is discussed further in the following.

Whilst the communications signals at the primary contact A1 or A2 of the site-sharing adapter A (which signals are thus present at pin/plug numbers 3 and 5), and which are transmitted via a communications bus 181*a* or 181*b*, specifically in the form of an RS485 bus in this case, in accordance with the AISG specifications on which the embodiment shown is based, the communications signals can be converted for example into TTL signals by means of the communications bus transceiver 181 provided in the site-sharing adapter A (in this case in the form of an RS485 transceiver) and passed via the bus line 181' for example by means of a communications modem 183 connected downstream, in such a way that the corresponding transmission information can be transmitted in a frequency-modulated form via a single-wire connection, specifically via a communications line 183', to terminal number 3, subsequently resulting in the corresponding communications connection being produced via the corresponding plug-in connection to plug terminal number 3 in the M-RET unit.

For the aforementioned TTL signals, which are output levels of transistor circuits, voltages u≤0.8 V represent the "low level" and u≥2.0 V represent the "high level", for example.

From the described construction, it therefore follows that in each case the two communications terminals numbers 3 and 5 for each primary terminal A1 or A2 are connected via a line 181*a* or 181*b* to the respective communications transceiver 181, thus in this case to the RS485 transceiver.

By means of this construction, the differentiated signals of the two lines 181*a*, 181*b* of the respective communications bus (in this case the RS485 bus), via which lines data is transmitted via terminals pins numbers 3 and 5, are converted into TTL signals which are transmitted via the line pair 181'. This applies to all of the provided primary terminals, in this case to the primary terminals A1 and A2. The protocols specified in the known standards AISG 1.1/3GPP are transmitted by half-duplex methods.

If this procedure for transmitting for example differentiated signals in accordance with frequency-modulated signals is applied to each of the primary terminals A1 and A2, and carrier frequencies which do not detract from one another are selected for the different primary terminals A1 and A2, a plurality of independent frequency-modulated signals can be transmitted simultaneously via a communications line 183'. The simultaneous transmission of individual, different carrier frequencies is referred to as frequency multiplexing.

A plurality of frequency-modulated signals of a plurality of mutually independent primaries can thus be transmitted simultaneously via a single pin 14 of the corresponding plug-in connection, therefore such as the AISG plug-in connection. On the receive side, there is likewise a communications modem 61, which demodulates these different-frequency signals and in turn supplies them in the form of TTL signals to the at least one or optionally a plurality of microprocessors 21, 21*a*, 21*b* of the multi-RET unit via a bus 61'. This physical conversion of the signals takes place in both directions, that is to say it is possible both to transmit and to receive, meaning that bidirectional and independent communication of a plurality of primaries is ultimately made possible. Depending on the configuration, the multi-RET unit may for example only be equipped with one processor 21, which is ultimately addressed by all of the primaries, in this case the primaries A1 or A2, or else may for example be equipped with one processor for each primary which can be connected.

Therefore, coming from the respective primary terminal A1, A2, as a result of the described bidirectional construction, the communications transceivers 181 assigned to the respective primary terminal convert the signals accordingly and supply them via a communications bus line pair 181', associated with the respective primary terminal, to the communications modem 183, via which the communications signals are subsequently transmitted via the downstream single-wire line 183' by the aforementioned frequency-multiplexing method, that is to say via plug interface number 3.

Similarly, the communication in the opposite direction from the multi-beam shape device takes place via communications terminal number 3, the communications bus line 183' to the communications modem 183, where the signals transmitted by frequency multiplexing are converted back into TTL signals and supplied via the respective connected line pairs 191' and the communications transceivers 181 to the respective pins numbers 3 and 5 of the respectively connected primaries A1 or A2.

At the same time, for each primary connection, in this case A1 and A2, via the diode summation circuit which is connected to the respective plug terminal number 1 and number 6, the direct current present there is passed through to the aforementioned separate detection line 161 for each primary terminal A1 or A2, the respectively higher voltage being passed on via the aforementioned diode OR circuit 171 to the DC/DC converter circuit without interruption. It is thus entirely conventional for a DC to be able to be present at the primary terminals A1 or A2, for example at plug terminal number 1 or number 6, and to fluctuate between 10 V and 30 V DC. The respectively highest DC voltage is passed on via the OR circuit 171 to the DC/DC converter 173 and transformed into a DC voltage of for example 8 V, which is subsequently supplied via the power supply line 175 to pin number 1 and from there via the downstream diode line 55a of the power supply means 19 in the M-RET unit to the supply for the electronics in the M-RET unit.

As a result, a permanent standby power supply means SVE without interruption is ensured, that is to say a permanent power supply for the multi-beam shape device M-RET without interruption. If for example one of the primaries switches off, as long as at least a second primary is connected, a constant DC voltage is always passed on via the diode circuit 171 to the permanent power supply line 175 for supplying the multi-beam shape device M-RET, without interruption.

So as to carry out particular operations of the multi-RET unit in accordance with the specifications, such as a voltage reset, the multi-RET unit requires information as to whether or not a connected primary is applying a voltage to the corresponding plugs or pins 14, 14'.

In principle, however, the question arises of which of the connected primaries is supplying or can supply the multi-RET with power. In this context, it is necessary to distinguish between the aforementioned standby power (standby, idle mode) and a primary load. Each primary which can supply an RET is able to cover the corresponding standby power specified in the AISG1.1/3GPP standard constantly. In this context, for covering the standby power of the multi-RET there is also the aforementioned standby supply means SVE comprising the diode OR circuit 171, which combines all of the aforementioned star points into a further star point and converts them via a step-up converter 173 to a voltage lower than all of the applied input voltages, that is to say smaller than the lowest input voltage specified in AISG1.1/3GPP at A1, A2 and A3. This voltage is subsequently supplied to one of the pins of the multi-RET which are provided for power supply, specifically in this case to plug terminal number 1. The only requirement on this voltage is that the electronics provided in the multi-RET be able to operate in the standby power range.

By way of the aforementioned circuit, it is thus ensured that, irrespective of the number of connected power-supplying primaries, the multi-RET is constantly supplied with power. In this context, it should be assumed that at least one primary supplies power to the site-sharing adapter.

The active power range differs from the standby power range in that, in addition to the standby power supply of the electronics installed in the multi-RET, one or more actuators can be actuated. The power uptake of these actuators can increase considerably from the standby power, meaning that a virtually arbitrary power uptake from any old connected primary can no longer be tolerated. Ultimately, it should be possible to divide the operating costs incurred by a site operated by more than network operator among these operators as a function of consumption.

So as to meet this requirement, additional measures are provided.

For this purpose, on the one hand a detection means is provided, which detects which primaries are connected.

For detecting which primary is responsible for the active power supply, reference is initially again made to the following.

In accordance with the aforementioned AISG1.1/3GPP standard, RET units may generally be supplied via pins numbers 1 and 6. In the site-sharing adapter A, depending on the primary terminal these pins are combined, via the aforementioned diodes 155 in the respective diode lines 155a, 155b, into the aforementioned star point 157, meaning that a diode OR circuit is likewise used. At these star points 157, it can now be detected whether or not a primary voltage is present at the terminals.

This information is supplied via the aforementioned detection line 161 (a separate detection line 161 being provided for each connected primary) to a further modem, in this case to the aforementioned detection modem 163, which in the embodiment shown is merely configured as a double modem since only two primaries A1 and A2 can be connected and need the information thereof evaluated. The information is thus transmitted and communicated to the multi-RET unit via this detection modem 163 by means of different frequencies via a shared socket 14' or a shared plug/pin 14, in this case plug terminal number 5, in the form of frequency-modulated signals by frequency multiplexing. In the multi-RET unit, via the aforementioned detection line 75, the corresponding frequency-modulated signal is subsequently conveyed for demodulation to the detection modem 77, which subsequently communicates to the microprocessor, via a line or a bus 77a, which of the primaries is supplying a direct current.

The microprocessor (21; 21a, 21b) detects which of the primaries is sending commands which in turn activate actions in the active power range or which can only be carried out in the active power range.

In the context of the invention, it is thus provided that the multi-RET detects which primary control apparatus has activated particular operations in the active power range, so as subsequently to communicate this information, for example via a free pin (or socket) which is not yet occupied in the standards or is currently unused, that is to say in the present case via plug or pin or socket number 8, to the site-sharing adapter A, which switches the aforementioned power toggle switch 167 in such a way that the two detection lines 161 in this embodiment are connected to plug terminal number 6, which is additionally provided for the power supply and via which the active power is to be drawn from the relevant primary A1 or A2. In other words, by means of the power toggle switch 167 it is ensured that the active power is now drawn from the primaries A1 or A2 which sent the multi-RET the corresponding command to be carried out in the active power range.

The supply voltage selected by means of the power toggle switch 167 is provided to the multi-RET for example via the second pin provided in the AISG1.1/3GGP standard for the power supply, in this case having pin-number 6.

The two pins numbers 1 and 6 which are occupied for supplying power are thus linked on the part of the multi-RET, via the aforementioned diode OR circuit 55' comprising the two diode lines 55a and 55b and the diodes 55 connected thereto, to the aforementioned star point 57. From this star point 57, the aforementioned network component 19 is subsequently supplied to the multi-RET. Since the supply voltage selected by means of the power toggle switch 167 is above the voltage which is supplied by means of the step-down converter of the multi-RET, it is guaranteed that the active power is drawn from the primary control apparatus which previously sent the corresponding command.

In other words, the standby power supply SVE and the active power supply means AVE are thus connected together with the aforementioned star point 57 by means of the two diode lines 55a and 55b in the multi-RET unit M-RET via the OR circuit 55' thus formed, meaning that the standby power supply can switched to an active power voltage supply and vice versa in the multi-RET unit without interruption.

It has already been explained how it is evaluated, by means of the detection modem 163, which primary is connected or which primary control apparatus is or is not supplying DC voltage.

Alternatively, however, corresponding information for this purpose could also be evaluated by means of the already provided communications modem 183 and accordingly passed on to the multi-beam shape control device M-RET. This can be brought about in that, if there is no voltage at a primary terminal A1 or A2, the communications modem 183 transmits a continuous signal or another characteristic signal at the corresponding frequency, communicating to the multi-RET unit which primary terminal is being supplied with power and which is not. If there is a voltage, no signal or no other characteristic signal is sent, meaning that the frequency can be exploited for data communication between the primary and the multi-RET unit. In this way, in each site-sharing adapter and in each multi-RET unit the aforementioned detection modem 163 or 77 could be dispensed with, as is shown in principle for a corresponding site-sharing adapter A by way of FIG. 6b and FIG. 6c.

Figure 6A:
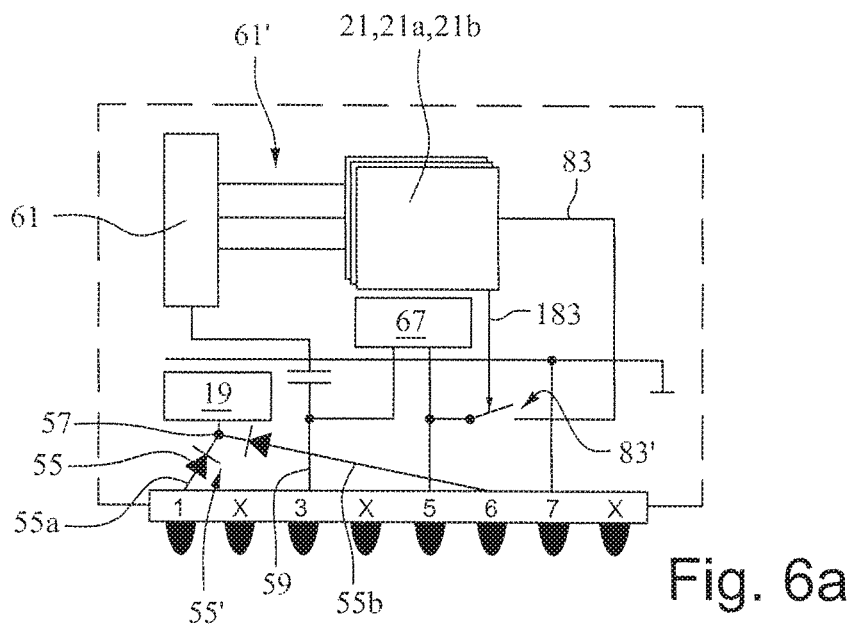

In this regard, in the drawing according to FIG. 6a a slightly modified multi-beam shape control device M-RET is also used, and additionally no longer comprises a detection modem 77. Since the corresponding evaluation as to which primary is present and supplying voltage takes place via the communications path 183' in the site-sharing adapter and via the lines 59 in the multi-RET unit and the communications modem 61 in this case, it is now also possible to convey the power toggle switch 167 and thus the switching line 167', which proceeds from this switch and which in the previous embodiment was supplied to the site-sharing adapter A by pins number 8 of the multi-RET unit, from the microprocessor 21 via pin number 5. The corresponding switching line 83 from the microprocessor 21 thus does not lead via pin 8, as in the embodiment according to FIG. 5, but via a switching means 83' on the RET side to pin number 5 which is now unoccupied in this type of operation, since the detection modem 163 comprising the associated output line 165 is no longer connected to the pin 5. In this context, the switching means 83' is actuated from the microprocessor 21 via a first switching line 83", so as to leave the further or second switching line 83 for the switching means 167 effective for the active power supply means AVE when the switching means 83' is closed.

Figure 6B:
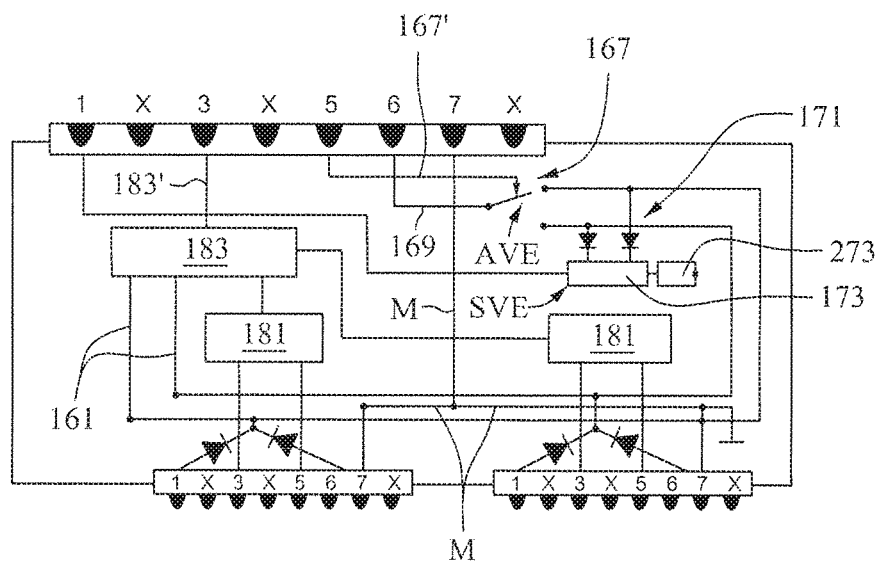
FIG. 6b is a more detailed drawing of a first embodiment according to the invention of a primary or secondary adapter comprising two provided primary terminals.
Figure 6C:
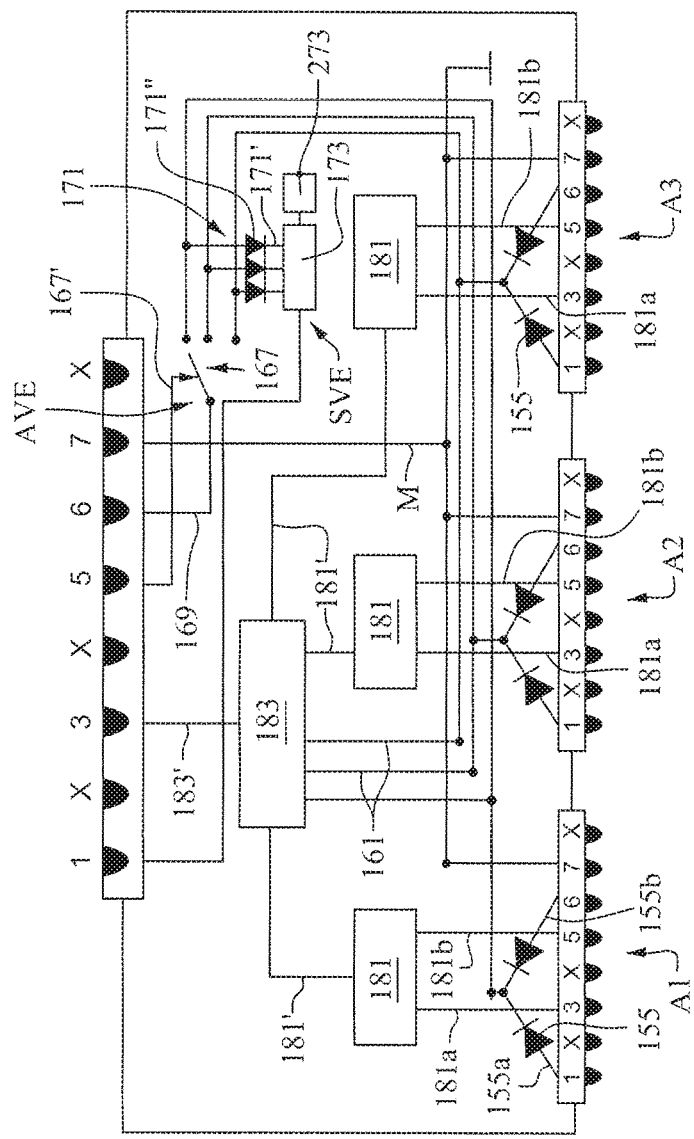
FIG. 6c is a more detailed drawing of a first embodiment according to the invention of a primary or secondary adapter comprising three provided primary terminals.

FIG. 6c is a corresponding drawing of a site-sharing adapter A in the same case, when three primary terminals A1, A2 and A3 rather than two are provided while dispensing with a detection modem 163.

Further, an earth connection line M is also provided in the site-sharing adapter A, irrespective of whether it is a primary adapter PA or a secondary adapter SA, meaning that the respective terminal pin or terminal plug number 7 on the connection side of a primary is connected to the relevant pin or plug number 7 on the connection side 38 of the adapter A. As can be seen from the drawing, by means of the branched earth line M a connection can thus also be made between all of the plugs or terminals number 7 for all of the provided primary terminals A1, A2, A3.

Finally, FIG. 5b and for example also FIG. 6b show another further DC/DC converter 273 which serves to provide a suitable operating voltage for the operation of the site-sharing adapter A. This is necessary because the electronics installed in the site-sharing adapter A likewise require a voltage supply, for example 5V DC.

In the following, reference is made to FIG. 7, which shows a corresponding circuit arrangement for the case of a site-sharing adapter A to which three primaries A1, A2 and A3 can be connected.

From this, it is also clear why the corresponding modems are not merely formed in the M-RET unit as a triple modem, but in this embodiment also as a triple detection modem 163 and as a triple communications modem 183. In other words, in accordance with the provided terminals for connecting primaries, the respective modem always has to be configured in such a way that it can carry out an evaluation in accordance with the number of connectable primaries.

Figure 7:
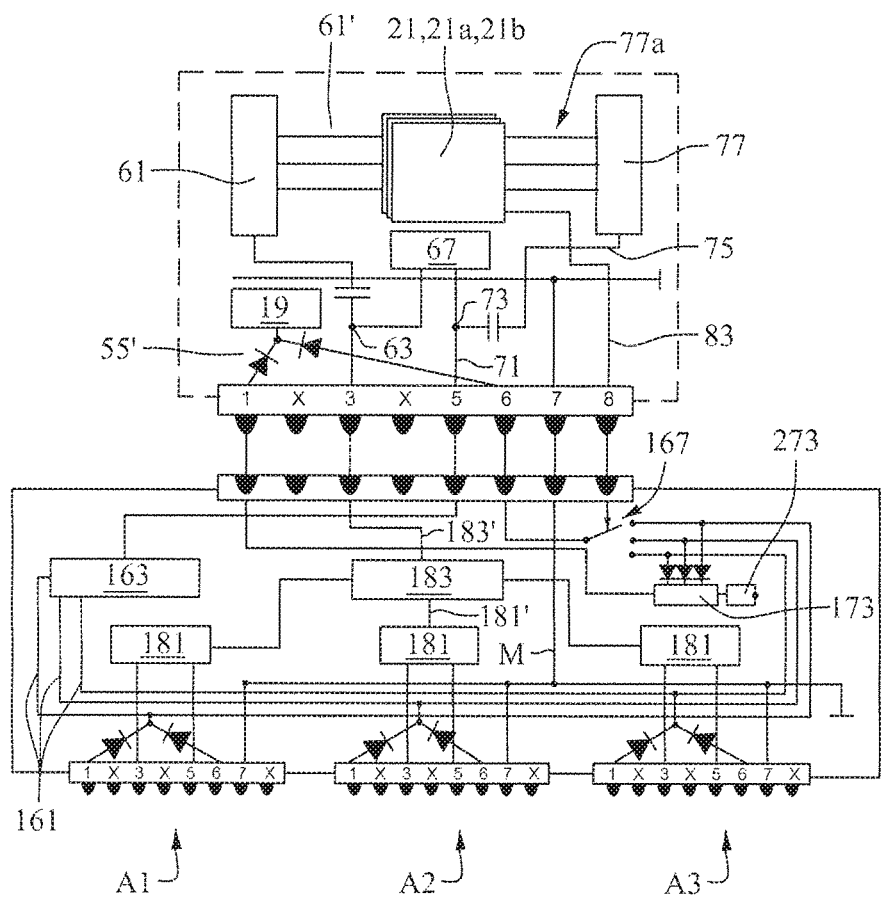
FIG. 7 shows a further embodiment, modified from FIG. 5b, using a primary or secondary adapter to which three primaries can be connected.

In the variant embodiments in accordance with the described drawings, site-sharing adapters A are thus shown which can in principle be used as primary adapters PA and also as secondary adapters SA, three detection lines 161 thus for example being provided in the embodiment of FIG. 7 (which is provided for connecting three primaries), and leading to the detection modem 163 if a conversion—as shown in FIGS. 5a and 5b—is to take place. In the variant embodiment according to FIGS. 6a, 6b and 6c, a detection modem of this type would also be omitted, as explained with reference to FIGS. 6a and 6b. Likewise, three communications transceivers 181 are provided for the three primary terminals A1, A2 and A3, and are all connected via the line pairs 181' thereof to the communications modem 183.

In this case, the aforementioned diode circuit 171 also comprises three diode lines 171', so as to connect all of the detection lines 161 through to the DC/DC converter 173.

Figure 8:
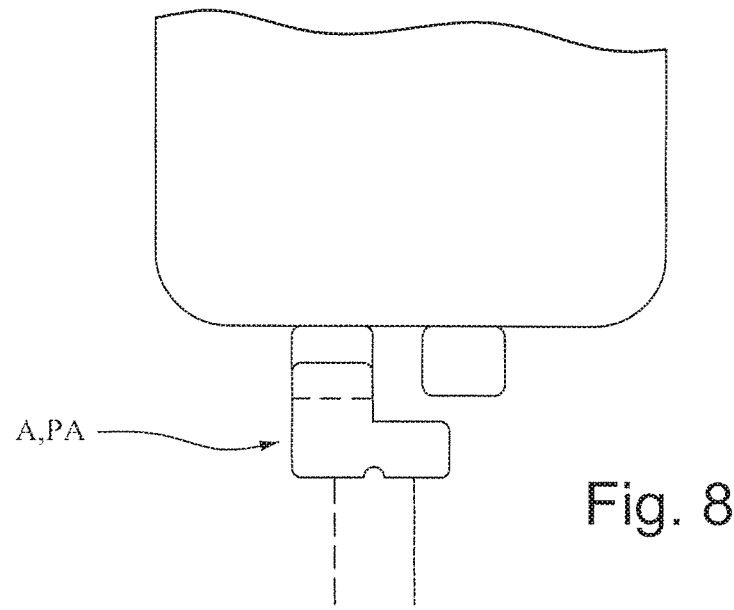
FIG. 8 is a drawing showing how a primary adapter can be connected to a primary connection of a multi-RET unit while blocking the secondary terminal.

For example, FIG. 8 shows how a primary adapter PA may in principle be configured. Specifically, the additional primary terminal A2 thereof can be formed and connected orientated in such a way that the second, secondary communications terminal 113 is virtually blocked, since the housing of the primary adapter PA covers and renders inaccessible at least a sub-region of the secondary communications terminal.

Figure 9:
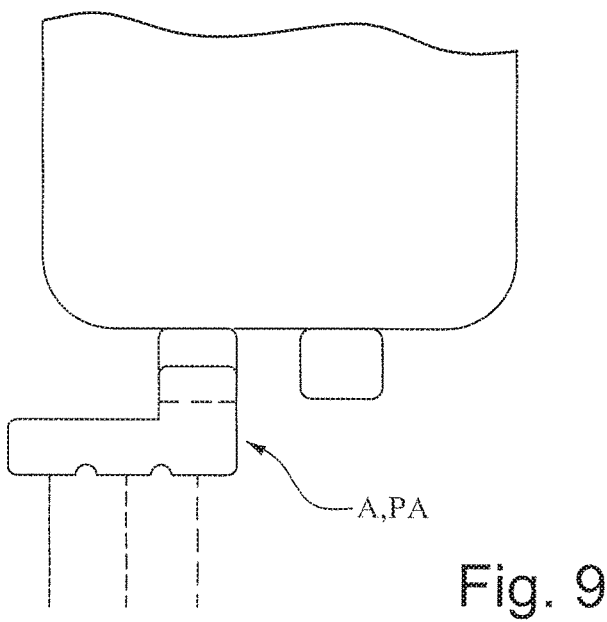
FIG. 9 shows a further modification from FIG. 8 in the case of a primary adapter for connecting three primaries.

FIG. 9 shows that the configuration may also be reversed, in such a way that a secondary terminal remains free for further use. This naturally applies equally to a site-sharing adapter A which provides a terminal only for two or for example for three or even more primaries. A corresponding expansion is possible without difficulties, as can be seen from the extension from two to three primaries.

Unlike in FIGS. 8 and 9, the site-sharing adapters shown therein may for example also be formed in such a way that they can be mounted in an arrangement twisted with respect to FIGS. 8 and 9, for example in an arrangement twisted through 180°, that is to say mounted in a mounting position in which the respective other terminal, in this case the secondary terminal for connecting chaining, for example to a subsequent antenna, remains free. In this context, the examples shown in FIGS. 8 and 9 also apply equally to a secondary adapter which can be connected to the secondary terminal 113, although this is not shown in the drawings.

The invention claimed is:

1. Multi-beam shape supplementary device for connection to a primary or secondary communications terminal of a multi-beam shape control device for an antenna system for mobile communications, comprising:
 a site-sharing adapter in the form of a primary adapter, which is provided with a female or male connector configuration on the associated coupling terminal thereof, or in the form of a secondary adapter, which is provided with a male or female connector configuration on the associated coupling terminal thereof,
 the site-sharing adapter comprises at least two primary terminals for connecting at least two primary control apparatuses,
 the plug and/or terminal configuration or terminal occupation at the primary terminals are compatible with the terminal configuration or terminal occupation of the coupling terminal of the site-sharing adapter,
 the terminal pins or terminal sockets, provided for the bidirectional signal transmission in the site-sharing adapter, on the at least two primary terminals are connected to a terminal pin or a terminal socket, provided for the bidirectional signal transmission, of the coupling terminal so as to form a bidirectional signal transmission path,
 the bidirectional transmission path is configured in such a way that the differentiated communications signals at the at least two primary terminals are converted into frequency-modulated signals, which are present at the coupling terminal, the frequency-modulated signals present at the coupling terminal conversely being converted into differentiated communications signals which are present at the relevant terminal pin or the relevant terminal socket of an associated primary terminal.

2. Multi-beam shape supplementary device according to claim 1, wherein the two terminal pins or sockets of each primary terminal, which are provided for the signal communication, are connected to a communications transceiver, which is configured such that the differentiated communications signals which are present at the respective primary terminal being converted into TTL signals thereby, and conversely TTL signals which are present at the communications transceiver being converted into differentiated communications signals which are present at the respective primary terminal.

3. Multi-beam shape supplementary device according to claim 1, further comprising a communications modem, which is connected via a communications line in the form of a single-wire connection to a corresponding terminal pin or a corresponding terminal socket on the coupling terminal, on the one hand, and via a separate line or a separate bus in each case to the communications transceivers, on the other hand, which are each connected to a primary terminal assigned thereto.

4. Multi-beam shape supplementary device according to claim 1, further comprising a standby supply means provided in the site-sharing adapter; configured to connect a direct current supply without interruptions through from one or more of the primary terminals to a terminal pin on the coupling terminal side or to a terminal socket of the at least one primary terminal.

5. Multi-beam shape supplementary device according to claim 4, wherein for each primary terminal the standby supply means comprises an electric connection to a respective detection line, which is connected to a supply circuit, in the form of an OR circuit, providing a direct current supply without interruptions via a downstream DC/DC converter to at least one terminal pin or one terminal socket on the coupling terminal.

6. Multi-beam shape supplementary device according to claim 5, wherein the power supply circuit comprises or consists of a diode circuit, for connecting the detection lines provided for each primary terminal to the DC/DC converter via a separate diode line.

7. Multi-beam shape supplementary device according to claim 1, wherein there is a connection from each primary terminal via at least one or via at least two terminal pins or terminal sockets provided therein, via a downstream diode line in each case, to a detection line assigned to the respective primary terminal.

8. Multi-beam shape supplementary device according to claim 1, wherein an active power supply means is provided for guaranteeing the active power supply for actions in the active power range as a function of the command, which is present at the coupling terminal, transmitted via a particular primary terminal.

9. Multi-beam shape supplementary device according to claim 8, wherein the active power supply means comprises a power toggle switch, which provides a connection from each of the plurality of detection lines to an energy supply line, which is connected to at least one power supply terminal pin or one power supply terminal socket or to at least one of two power supply terminals at the coupling terminal.

10. Multi-beam shape supplementary device according to claim 8, wherein the active power supply means is connected to the communications modem, specifically to the inputs of the communications modem which are provided therefor and to which the detection lines, which are connected to the respective primary terminals, are connected, in such a way that, depending on whether and to which primary terminal a primary is connected, signalling is emitted via a single-wire connection proceeding from the communications modem to a terminal pin or terminal socket on the coupling terminal side.

11. Multi-beam shape control device, to which a multi-beam shape supplementary device according to claim 1 is connected, further comprising a communication modem provided in order, on the one hand, to receive the signals which are present at the plurality of primary terminals and, vice versa, to transmit signals emitted by the multi-beam shape control device to the primary terminals.

12. Multi-beam shape control device according to claim 11, wherein the multi-beam shape control device comprises a detection modem, which transmits a detection signal—received from the primary or secondary terminal via at least one terminal pin or terminal socket provided therein, it being possible in principle for an active power supply to be provided via said primary terminal—to a microprocessor or to at least one of a plurality of microprocessors, from which a signal is emitted to the site-sharing adapter via a control line to actuate the power toggle switch of the active power supply means.

13. Multi-beam shape control device according to claim 11, wherein at least two terminal pins or sockets are provided on the primary or secondary terminal, the standby DC supply being provided via the one terminal pin or terminal socket and the active power supply via the other terminal.

14. Multi-beam shape control device according to claim 13, wherein the two terminal pins or sockets, via which on the one hand the standby power and on the other hand the active power supply are supplied to the primary or secondary terminal, are in each case connected via a diode line and/or via a downstream star point to an energy supply means in the multi-beam shape control device.

15. Multi-beam shape control device according to claim 11, wherein a communications modem is further provided, via which signals, which are present at the primary terminals or at the communications terminal of the primary or secondary terminal, are supplied to the microprocessor.

16. Multi-beam shape control device according to claim 11, wherein the multi-beam shape control device is constructed in such a way that a control signal for the active power supply means and the associated power toggle switch is generated as a function of a command, transmitted via a communications modem and detected by the microprocessor, to switch the power toggle switch.

* * * * *